(12) United States Patent
Yang et al.

(10) Patent No.: US 8,040,691 B2
(45) Date of Patent: Oct. 18, 2011

(54) IN-WALL VIDEO/AUDIO SIGNAL ADAPTER DEVICE

(75) Inventors: Jui-Ming Yang, Keelung (TW);
Chia-Chieh Chen, Taipei (TW);
Yen-Tung Chen, Taipei Hsien (TW)

(73) Assignee: Yuan-Hsi Ting, Taipei Hsien (TW)

( * ) Notice: Subject to any disclaimer, the term of this patent is extended or adjusted under 35 U.S.C. 154(b) by 592 days.

(21) Appl. No.: 12/285,181

(22) Filed: Sep. 30, 2008

(65) Prior Publication Data
US 2010/0046194 A1    Feb. 25, 2010

(30) Foreign Application Priority Data
Aug. 19, 2008    (TW) ................................ 97214835 U

(51) Int. Cl.
*H01R 9/24* (2006.01)

(52) U.S. Cl. ...................... 361/823; 455/569.2; 710/305; 348/515; 725/128

(58) Field of Classification Search .................. 455/557, 455/558, 569.2, 341, 344, 41.2, 41.3, 345, 455/204; 710/2, 15, 100, 106, 105, 305; 361/823, 679.01, 679.2, 679.6, 727, 724, 361/679.02, 679.31, 679.57; 348/441, 445, 348/51, 607, 515, 143, 548; 345/166, 538, 345/539, 427, 204; 725/151, 136, 81, 104, 725/128, 111, 141; 248/220.21, 482, 483, 248/205.1
See application file for complete search history.

(56) References Cited

U.S. PATENT DOCUMENTS

| 6,101,403 A * | 8/2000 | Masuda ..................... 455/569.2 |
| 2006/0105808 A1 * | 5/2006 | Warren ......................... 455/557 |
| 2007/0162623 A1 * | 7/2007 | Kondo ............................. 710/2 |
| 2008/0161051 A1 * | 7/2008 | Schobbert et al. ............ 455/558 |

\* cited by examiner

*Primary Examiner* — Hung Duong
(74) *Attorney, Agent, or Firm* — Rosenberg, Klein & Lee

(57) ABSTRACT

An in-wall video/audio signal adapter device including a first adapter and a second adapter. The first adapter includes a transmitter unit fixed on a mount. The mount can be locked in a first cavity previously formed on a wall. The second adapter includes a receiver unit fixed on a mount. The mount can be locked in a second cavity previously formed on the wall. CAT5/CAT6 Internet signal transmission cables are previously embedded in the wall. The Internet signal transmission cables are connected between the first adapter and the second adapter.

10 Claims, 11 Drawing Sheets

IN-WALL VIDEO/AUDIO SIGNAL ADAPTER DEVICE

BACKGROUND OF THE INVENTION

1. Field of the Invention

The present invention is related to an in-wall video/audio signal adapter device and more particularly to an in-wall video/audio signal adapter device including a first adapter and a second adapter. The first and second adapters are mounted in a first cavity and a second cavity previously formed on a wall. CAT5/CAT6 Internet signal transmission cables are previously laid in the wall for connecting the first adapter with the second adapter. Accordingly, the CAT5/CAT6 Internet signal transmission cables are hidden in the wall without being exposed to an indoor environment.

2. Description of the Prior Art

The existent video/audio signal transmission cable applied to video/audio multimedia products has a transmission distance limited to about 10 meters. However, in indoor layouts, a video/audio multimedia output equipment (such as a DVD player) is often spaced from a video/audio multimedia receiving equipment (such as a display) by a distance farther than the effective transmission distance of the video/audio signal transmission cable. In this case, the video/audio multimedia receiving equipment will be unable to receive the video/audio signals output from the video/audio multimedia output equipment.

A video/audio signal adapter has been developed to solve the above problem. The video/audio signal adapter includes a transmitter unit and a receiver unit. The transmitter unit includes a video/audio signal input connector and two RJ45 output connectors. The receiver unit including a video/audio signal output connector and two RJ45 input connectors. The video/audio signal input connector of the transmitter unit is connected to an output equipment (such as a DVD player) via a video/audio signal transmission cable. CAT5/CAT6 Internet signal transmission cables are connected between the RJ45 output connectors of the transmitter unit and the RJ45 input connectors of the receiver unit. The video/audio signal output connector of the receiver unit is connected to a receiving equipment (such as a display) via a video/audio signal transmission cable. Accordingly, the allowable mounting distance between the output equipment and the receiving equipment can be effectively elongated.

However, according to the above arrangement, the CAT5/CAT6 Internet signal transmission cables connected between the transmitter unit and the receiver unit are exposed to an indoor environment. The CAT5/CAT6 Internet signal transmission cables have very long lengths. This leads to poor appearance of the indoor environment. Moreover, people may be tripped by the CAT5/CAT6 Internet signal transmission cables. In addition, the transmitter unit and receiver unit are not fixed on a stationary article. The transmitter unit and receiver unit are often randomly placed on the ground or on a desktop. Under such circumstance, the transmitter unit and receiver unit will occupy much room. Also, the transmitter unit and receiver unit are likely to displace due to external force. As a result, the signal transmission cables connected with the transmitter unit and receiver unit by way of plugging are apt to unplug and detach from the transmitter unit and receiver unit.

SUMMARY OF THE INVENTION

It is therefore a primary object of the present invention to provide an in-wall video/audio signal adapter device. The in-wall video/audio signal adapter device includes a first adapter and a second adapter. The first adapter includes a transmitter unit including a video/audio signal input connector, an equalizer, two RJ45 output connectors and a power input terminal. The transmitter unit is fixed on a mount. The mount can be locked in a first cavity previously formed on a wall. The second adapter includes a receiver unit including a video/audio signal output connector, an equalizer and two RJ45 input connectors. The receiver unit is fixed on a mount. The mount can be locked in a second cavity previously formed on the wall. CAT5/CAT6 Internet signal transmission cables are previously laid in the wall. The first adapter is connected to an output equipment via the video/audio signal input connector. The CAT5/CAT6 Internet signal transmission cables are connected between the RJ45 output connectors of the first adapter and the RJ45 input connectors of the second adapter. The second adapter is connected to a receiving equipment via the video/audio signal output connector. Accordingly, the allowable mounting distance between the output equipment and the receiving equipment can be effectively elongated. The CAT5/CAT6 Internet signal transmission cables connected between the first and second adapters are hidden in the wall without being exposed to an indoor environment.

The present invention can be best understood through the following description and accompanying drawings wherein:

DETAILED DESCRIPTION OF THE PREFERRED EMBODIMENTS

Figure 1:
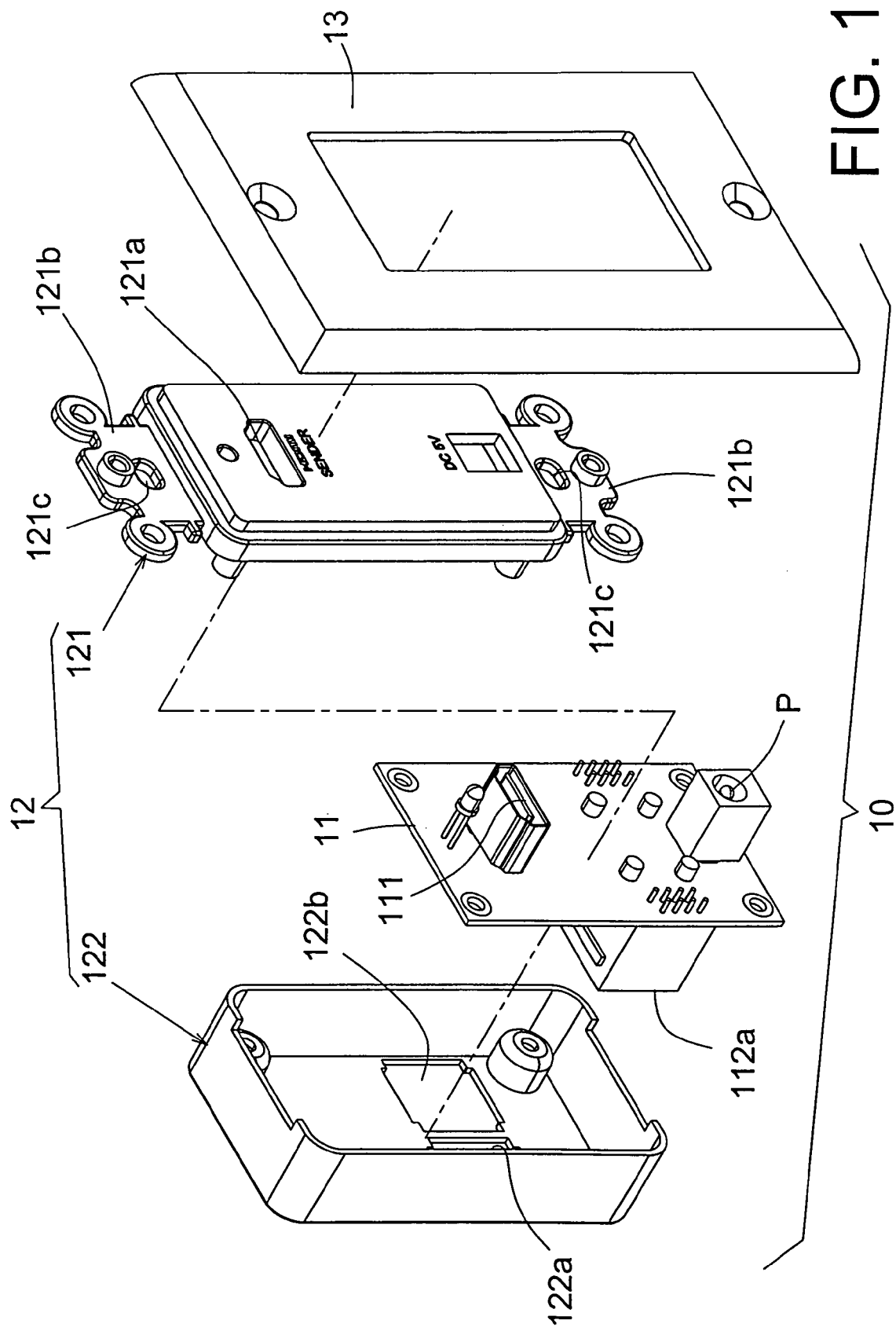
FIG. 1 is a perspective exploded view of the first adapter of the in-wall video/audio signal adapter device of the present invention.

Please refer to FIGS. 1 to 9. The in-wall video/audio signal adapter device of the present invention includes a first adapter 10 and a second adapter 20. The first adapter 10 includes a transmitter unit 11 including a video/audio signal input connector 111, an equalizer 14, two RJ45 output connectors 112a, 112b and a power input terminal P. The transmitter unit 11 is fixed on a mount 12. The mount 12 has fixing holes 121c for correspondingly locking the first adapter 10 in a first cavity W1 previously formed on a wall W. The second adapter 20 includes a receiver unit 21 including a video/audio signal output connector 211, an equalizer 24 and two RJ45 input connectors 212a, 212b. The receiver unit 21 is fixed on a mount 22. The mount 22 has fixing holes 221c for correspondingly locking the second adapter 20 in a second cavity W2 previously formed on the wall W. CAT5/CAT6 Internet signal transmission cables 40 are previously laid in the wall W. The first adapter 10 is connected to an output equipment 30 via the video/audio signal input connector 111. Thereafter, the CAT5/CAT6 Internet signal transmission cables 40 are connected between the RJ45 output connectors 112a, 112b of the first adapter 10 and the RJ45 input connectors 212a, 212b of the second adapter 20. Then the second adapter 20 is connected to a receiving equipment 30 via the video/audio signal output connector 211. Accordingly, the allowable mounting distance between the output equipment 30 and the receiving equipment 50 can be effectively elongated. The CAT5/CAT6 Internet signal transmission cables 40 connected between the first and second adapters 10, 20 are hidden in the wall W without being exposed to an indoor environment.

Figure 2:
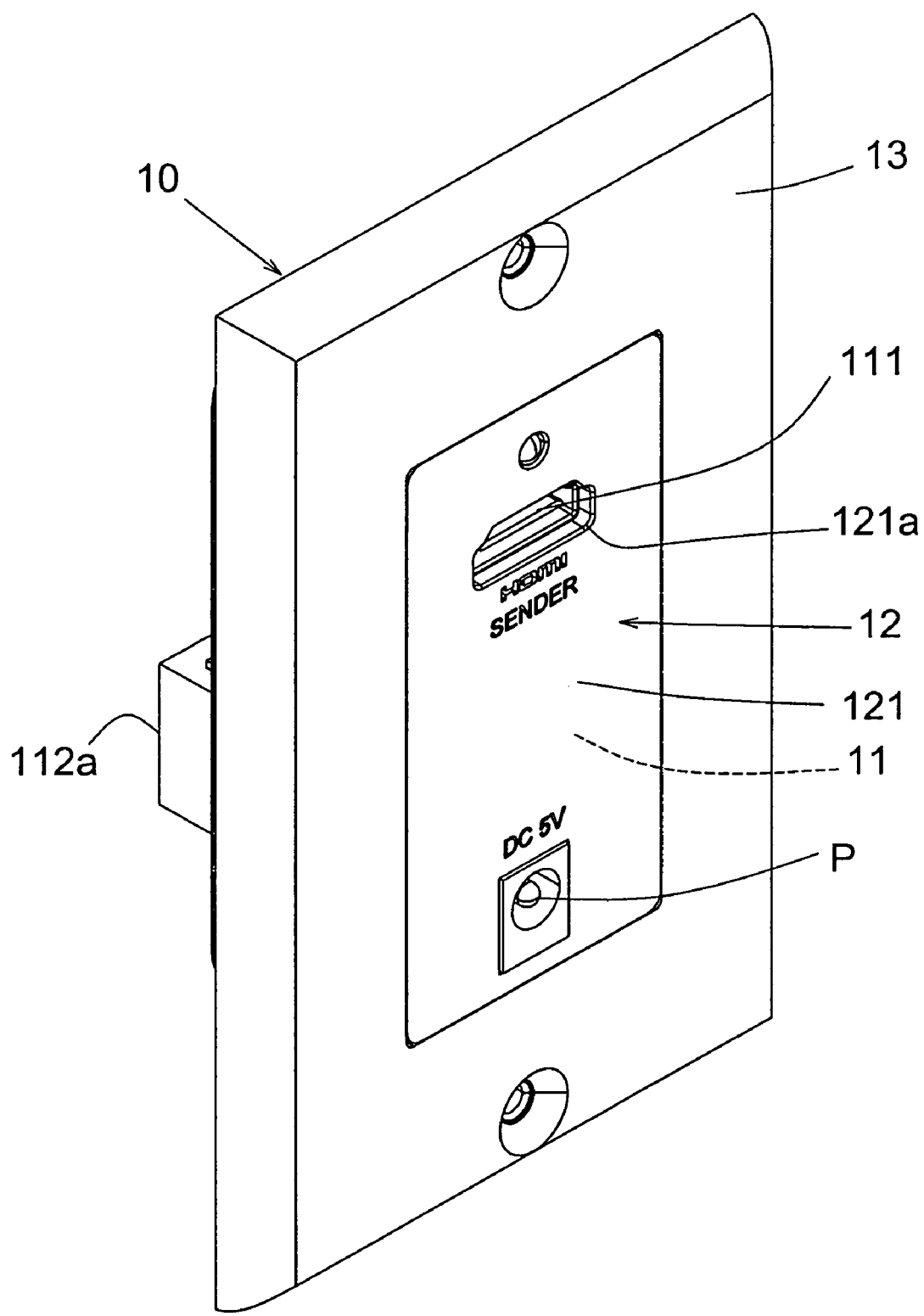
FIG. 2 is a front perspective assembled view of the first adapter of the in-wall video/audio signal adapter device of the present invention.
Figure 3:
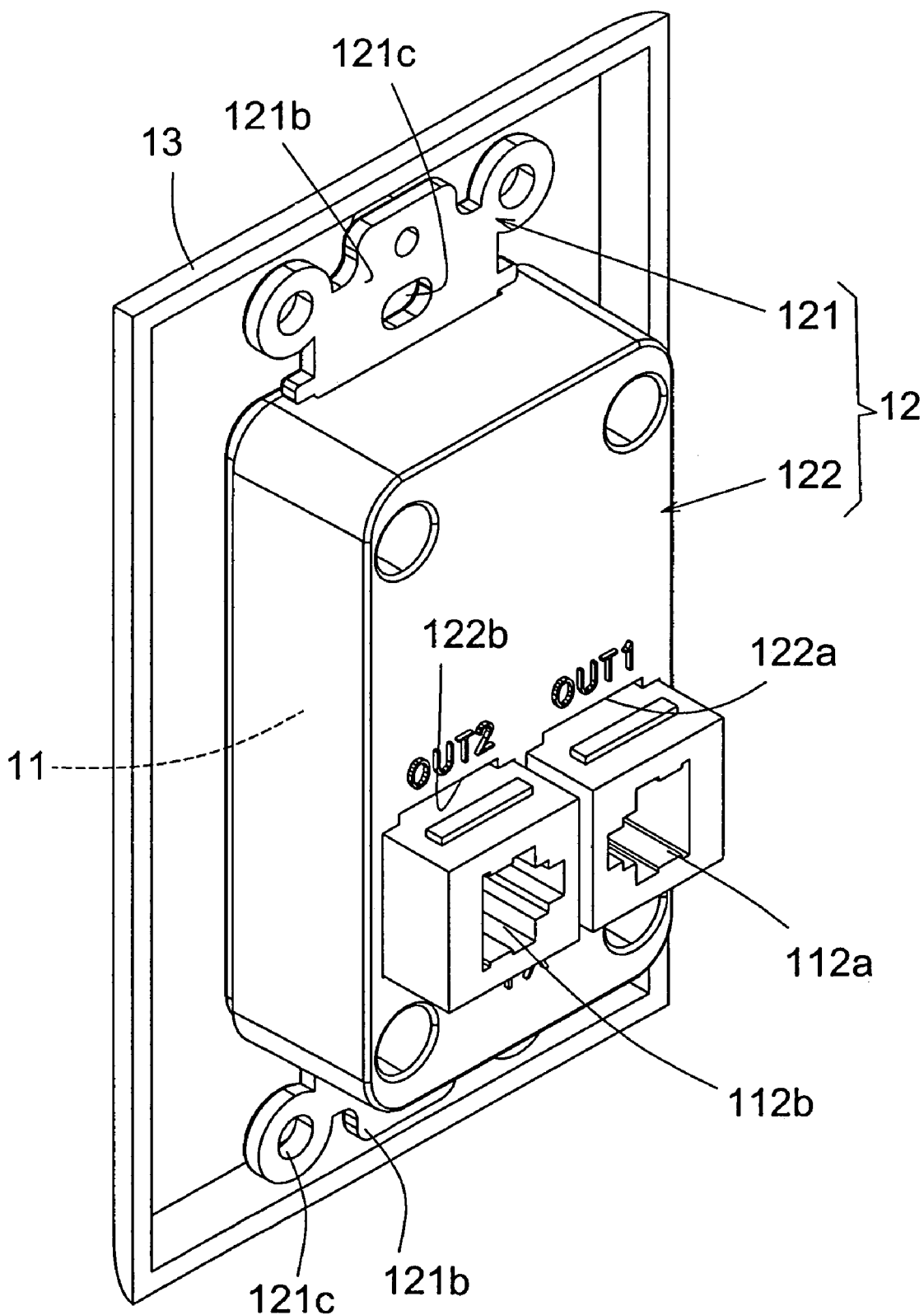
FIG. 3 is a rear perspective assembled view of the first adapter of the in-wall video/audio signal adapter device of the present invention.

Referring to FIGS. 1, 2 and 3, in the in-wall video/audio signal adapter device of the present invention, the mount 12 of the first adapter 10 includes a board body section 121. An insertion hole 121a is formed through the board body section 121 corresponding to the video/audio signal input connector 111 of the transmitter unit 11. Fixing lugs 121b are disposed on a periphery of the board body section 121 and project therefrom. Each fixing lug 121b is formed with multiple fixing holes 121c. The mount 12 of the first adapter 10 further includes a casing section 122 locked behind a back face of the board body section 121. The transmitter unit 11 is accommodated in the casing section 122. The casing section 122 is formed with at least one perforation 122a, whereby the RJ45 output connectors 112a, 112b of the transmitter unit 11 can extend through the perforation 122a to outward protrude from the casing section 122. Alternatively, the CAT5/CAT6 Internet signal transmission cables 40 can extend through the perforation 122a to be plugged into the RJ45 output connectors 112a, 112b.

Figure 4:
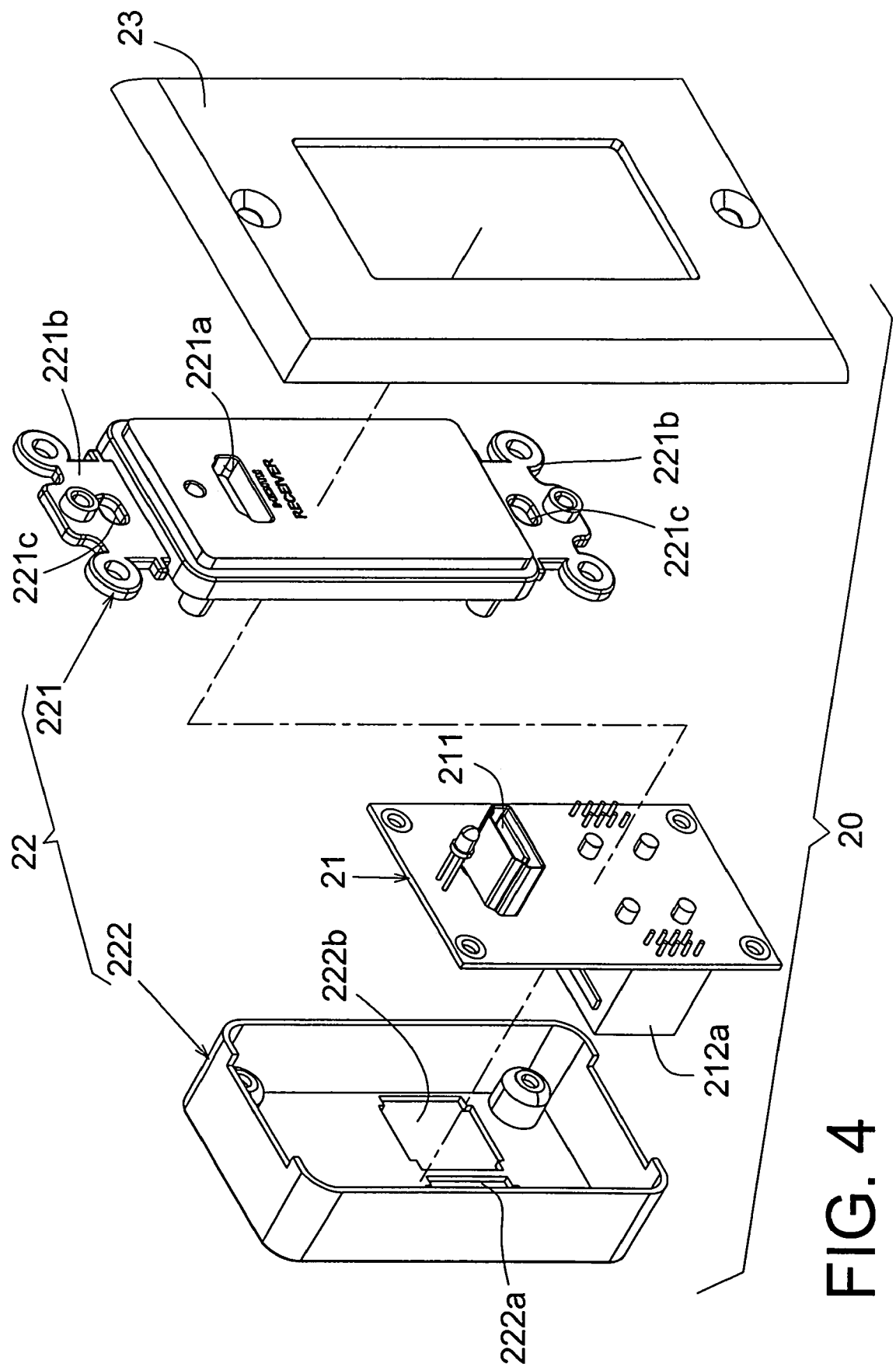
FIG. 4 is a perspective exploded view of the second adapter of the in-wall video/audio signal adapter device of the present invention.
Figure 5:
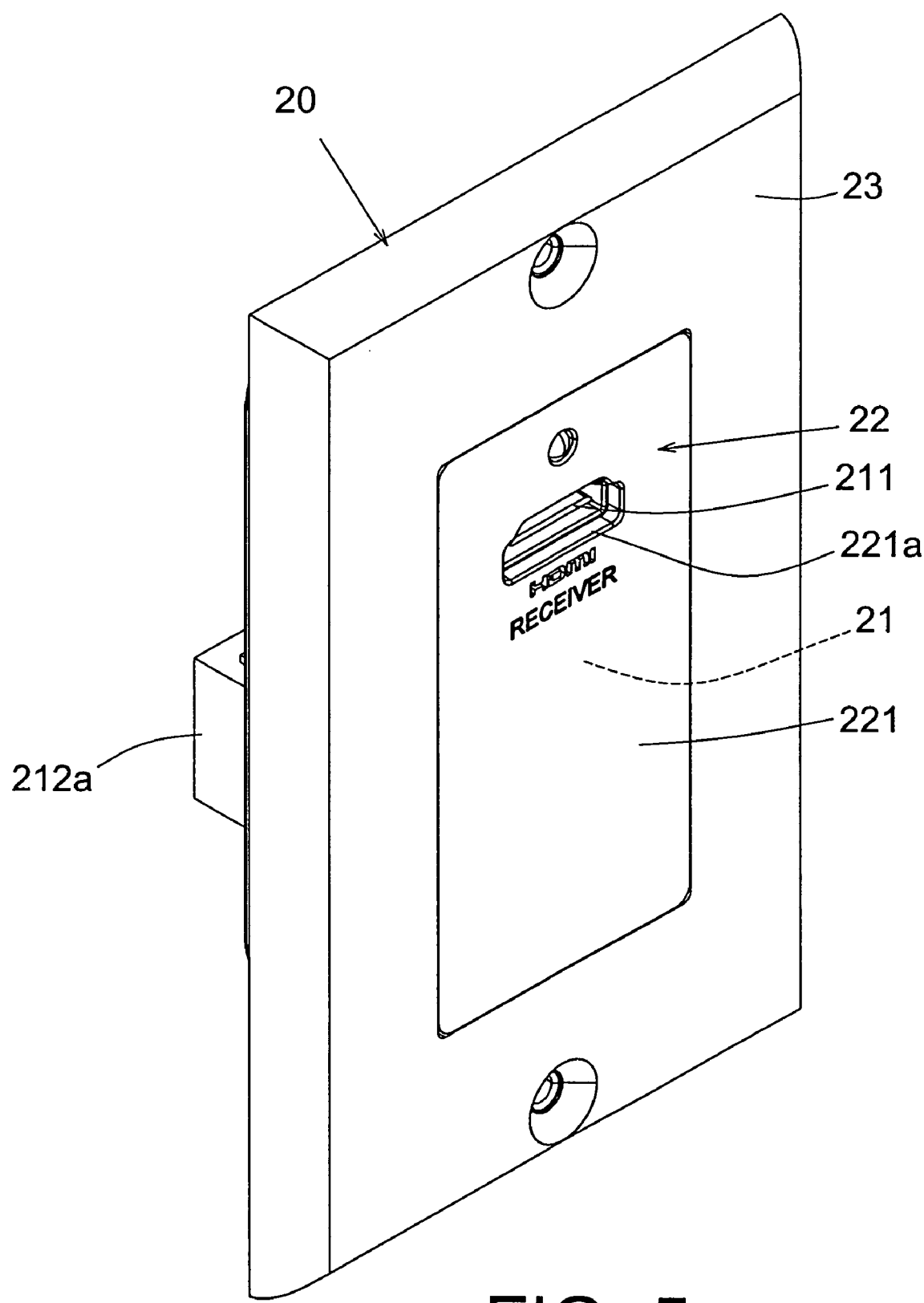
FIG. 5 is a front perspective assembled view of the second adapter of the in-wall video/audio signal adapter device of the present invention.
Figure 6:
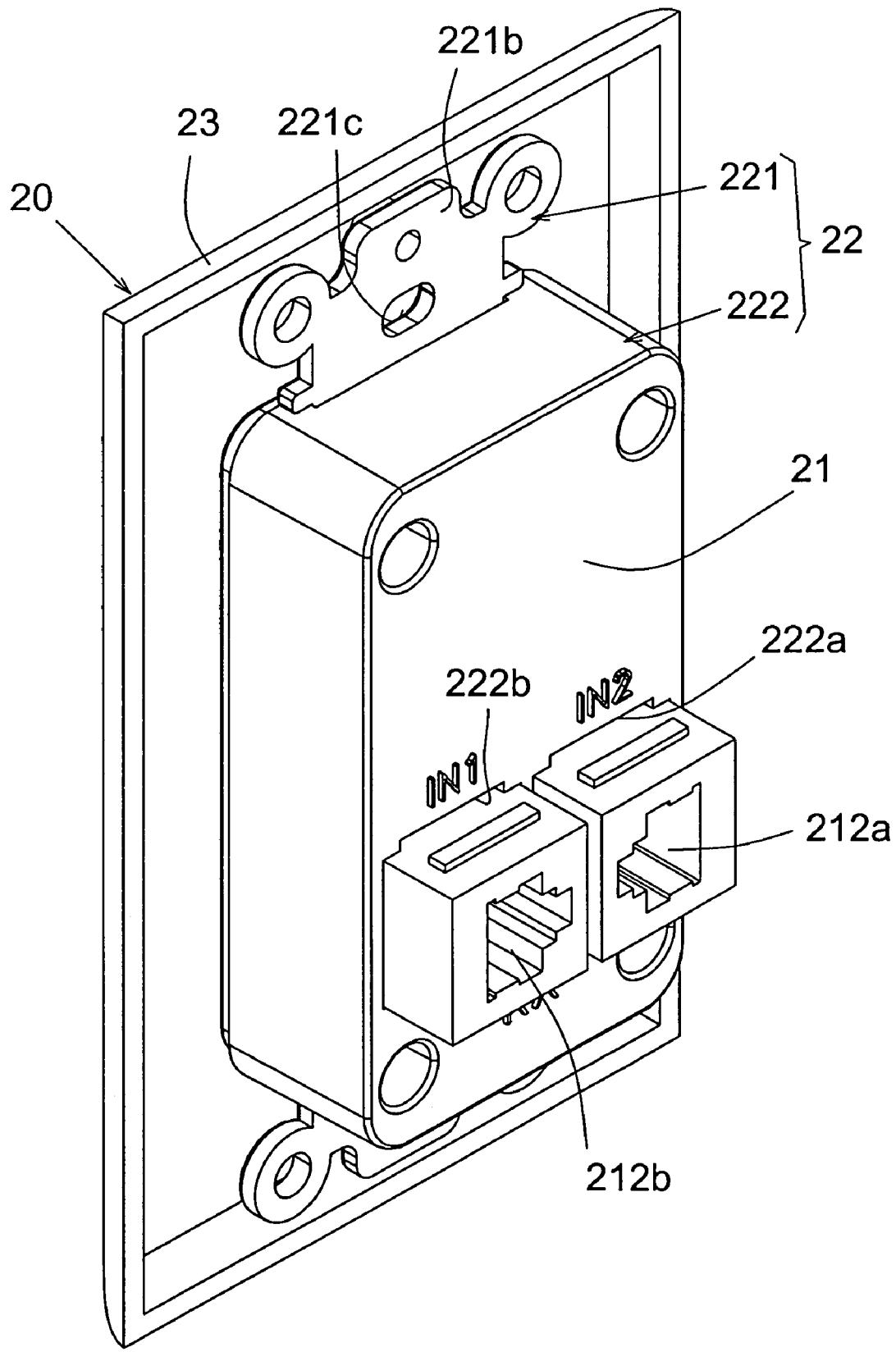
FIG. 6 is a rear perspective assembled view of the second adapter of the in-wall video/audio signal adapter device of the present invention.

Referring to FIGS. 4, 5 and 6, in the in-wall video/audio signal adapter device of the present invention, the mount 22 of the second adapter 20 includes a board body 221. An insertion hole 221a is formed through the board body 221 corresponding to the video/audio signal output connector 211 of the receiver unit 21. Fixing lugs 221b are disposed on a periphery of the board body 221 and project therefrom. Each fixing lug 221b is formed with multiple fixing holes 221c. The mount 22 of the second adapter 20 further includes a casing 222 locked behind a back face of the board body 221. The receiver unit 21 is accommodated in the casing 222. The casing 222 is formed with at least one perforation 222a, whereby the RJ45 input connectors 212a, 212b of the receiver unit 21 can extend through the perforation 222a to outward protrude from the casing 222. Alternatively, the CAT5/CAT6 Internet signal transmission cables 40 can extend through the perforation 222a to be plugged into the RJ45 input connectors 212a, 212b.

Referring to FIGS. 1 and 2, the first adapter 10 further includes an outer decorative board 13. The outer decorative board 13 is fixedly mounted on an outer face of the mount 12 by way of locking or engagement. The outer decorative board 13 serves to decorate the mount 12 of the first adapter 10.

Referring to FIGS. 4 and 5, the second adapter 20 further includes an outer decorative board 23. The outer decorative board 23 is fixedly mounted on an outer face of the mount 22 by way of locking or engagement. The outer decorative board 23 serves to decorate the mount 22 of the second adapter 20.

Figure 7:
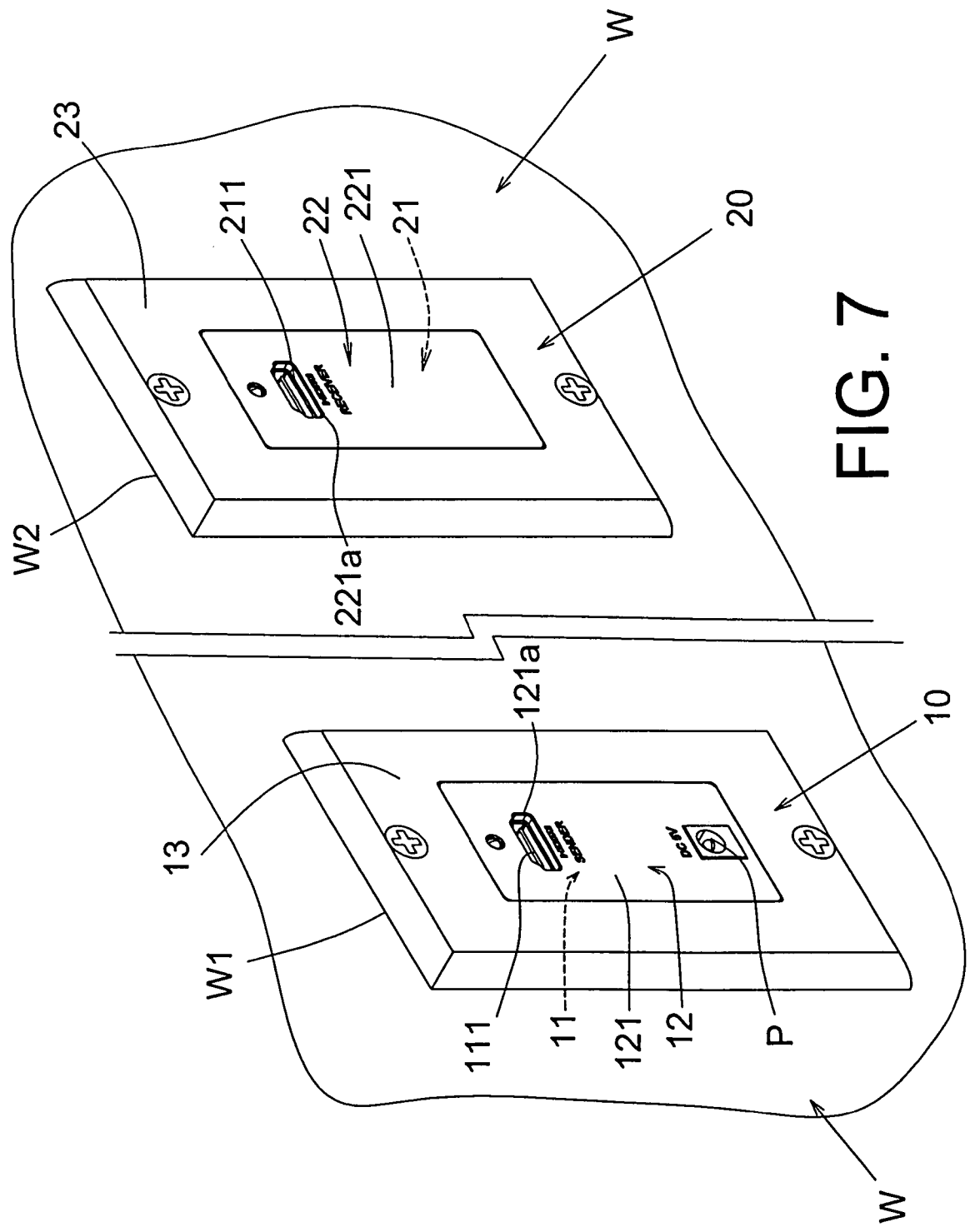
FIG. 7 is a perspective view showing that the first and second adapters of the in-wall video/audio signal adapter device of the present invention are mounted in a wall.
Figure 8:
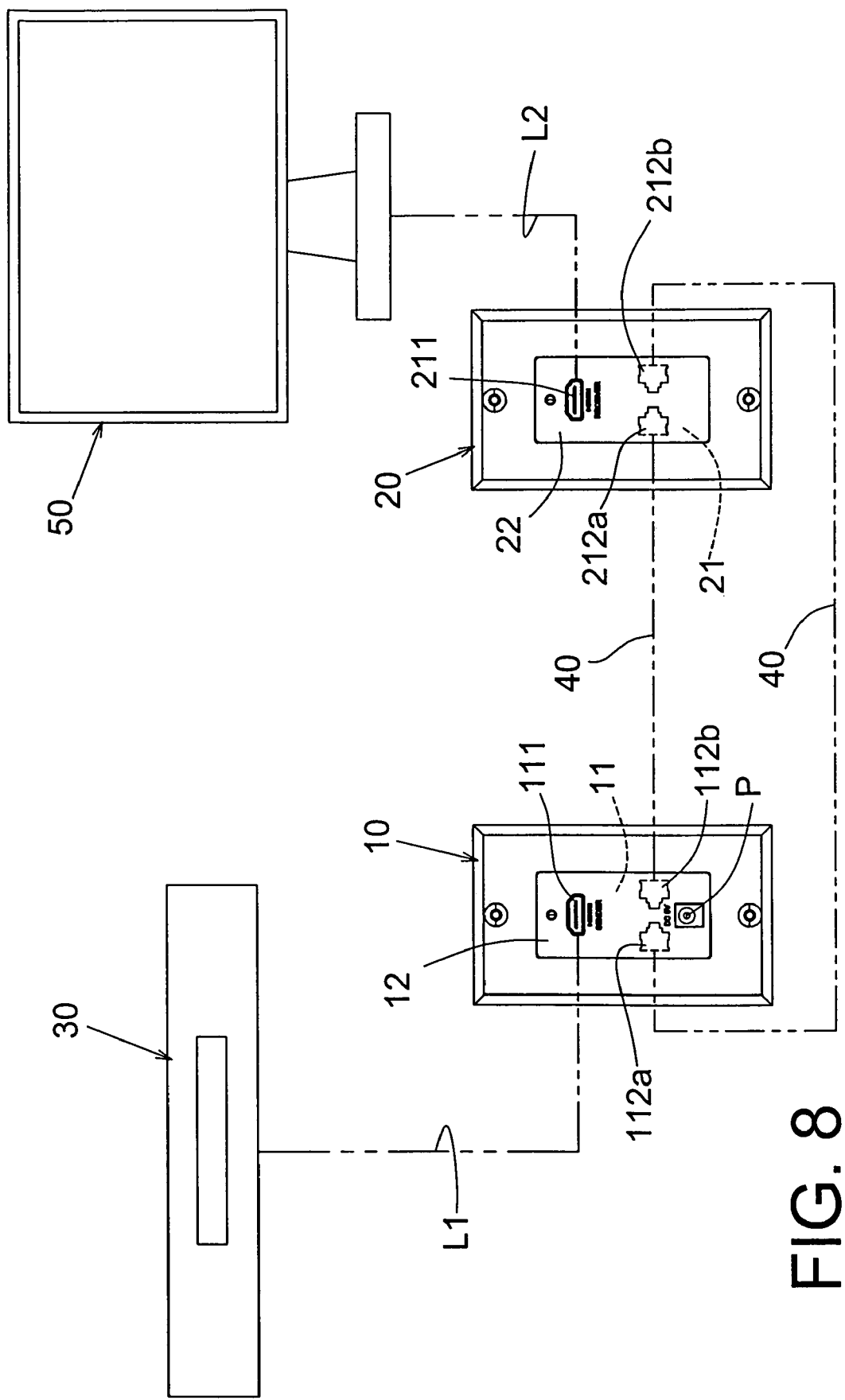
FIG. 8 shows the application of the in-wall video/audio signal adapter device of the present invention.
Figure 9:
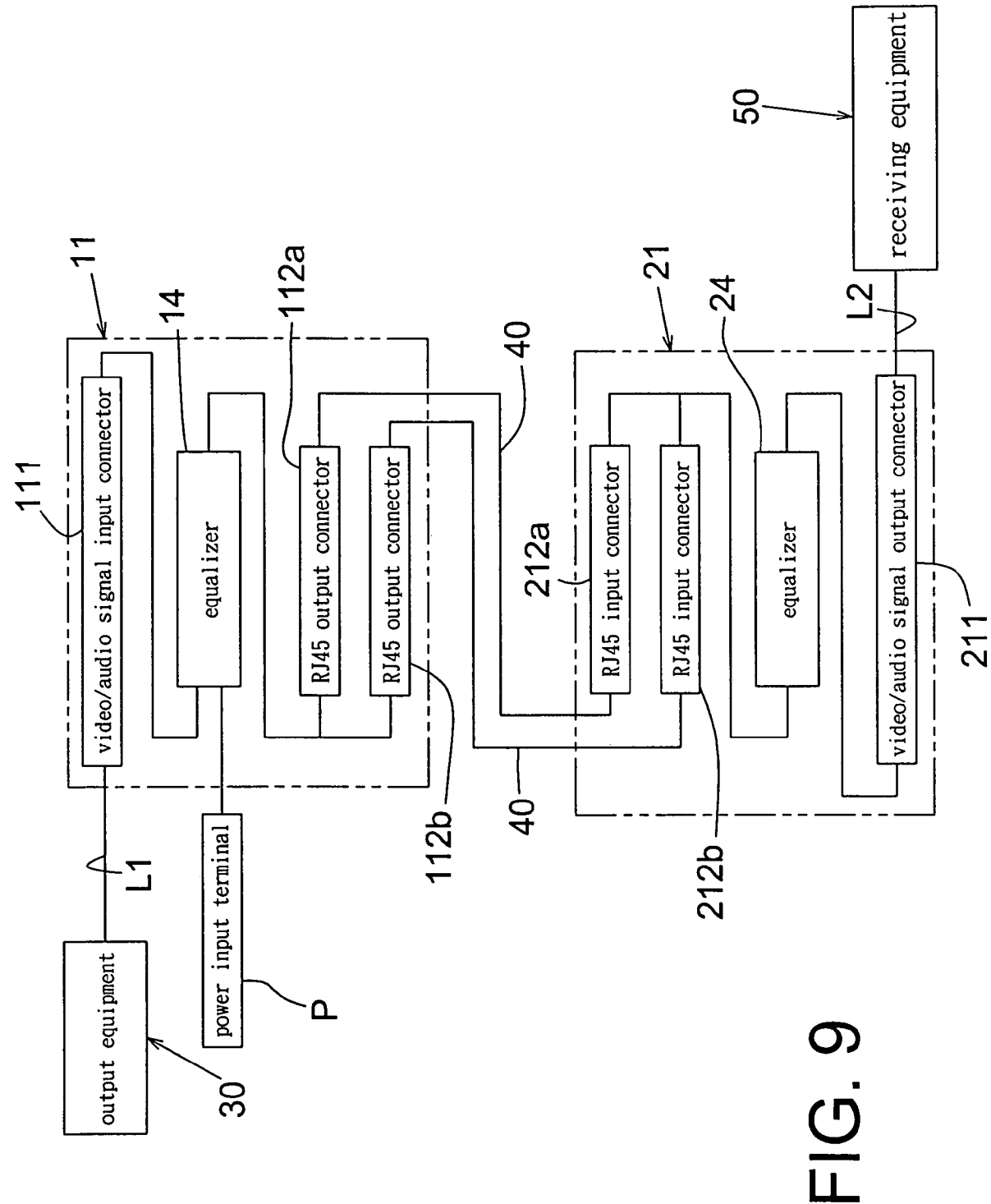
FIG. 9 is a block diagram of a first embodiment of the in-wall video/audio signal adapter device of the present invention, showing the application thereof.

Referring to FIGS. 7, 8 and 9, in application, the signal output terminal of the output equipment 30 such as a multimedia player can be connected to the video/audio signal input connector 111 of the first adapter 10 via a video/audio signal transmission cable L1 by way of insertion. The video/audio signal transmission cable L1 can be an HDMI cable or a DisplayPort cable. The equalizer 14 of the transmitter unit 11 serves to convert and send the signals to the RJ45 output connectors 112a, 112b. The equalizer 14 is powered by an external power supply via the power input terminal P. The CAT5/CAT6 Internet signal transmission cables 40 previously laid in the wall W are connected between the RJ45 output connectors 112a, 112b of the first adapter 10 and the RJ45 input connectors 212a, 212b of the second adapter 20. The equalizer 24 of the receiver unit 21 of the second adapter 20 serves to convert and send the received signals to the video/audio signal output connector 211. The video/audio signal output connector 211 is connected to the receiving equipment 50 (such as a display) via a video/audio signal transmission cable L2. The video/audio signal transmission cable L2 can be an HDMI cable or a DisplayPort cable. Accordingly, the allowable mounting distance between the output equipment 30 and the receiving equipment 50 can be effectively elongated. The CAT5/CAT6 Internet signal transmission cables 40 connected between the first and second adapters 10, 20 are hidden in the wall W without being exposed to an indoor environment.

Figure 10:
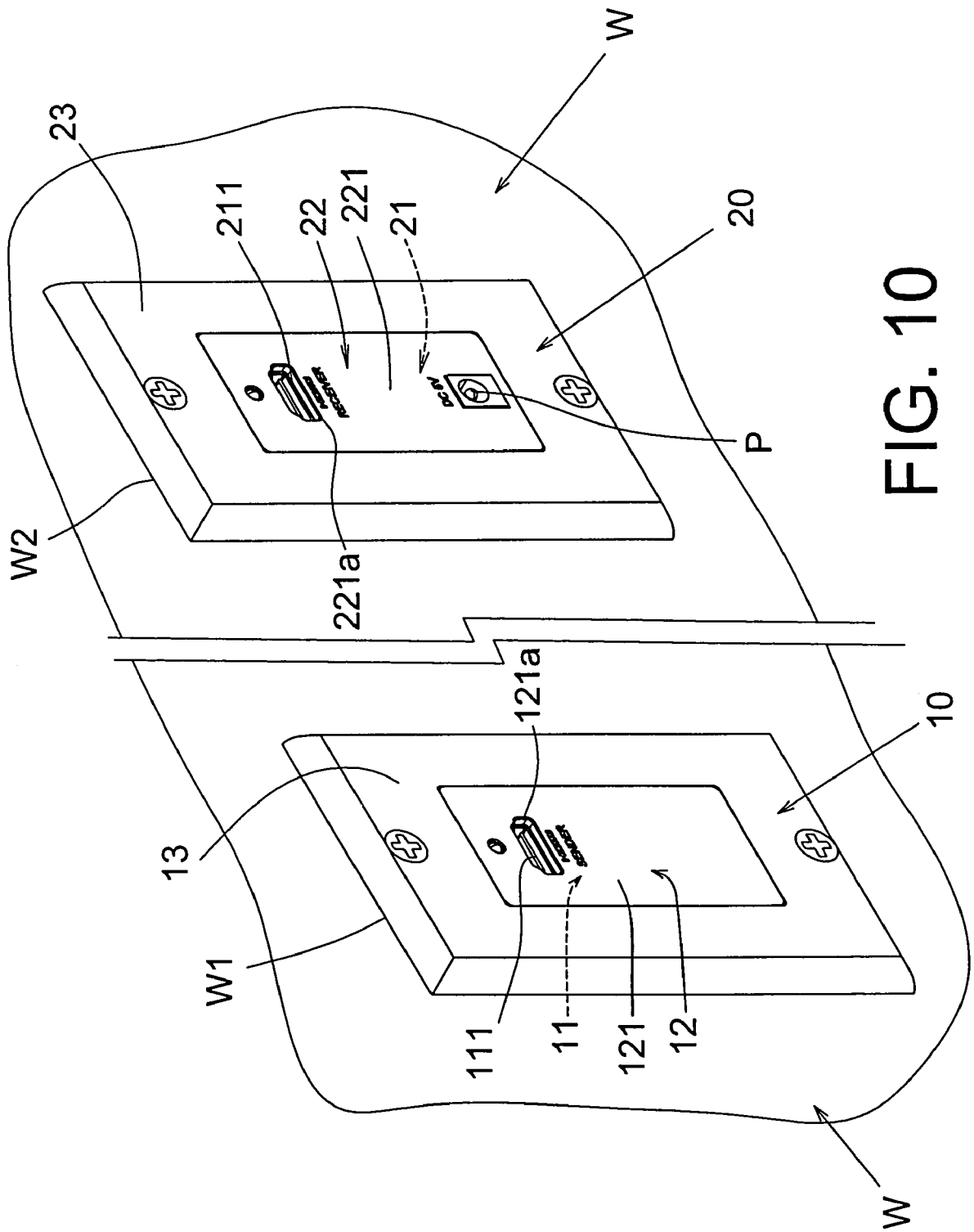
FIG. 10 is a perspective view showing that the first and second adapters of a second embodiment of the in-wall video/audio signal adapter device of the present invention are mounted in a wall.
Figure 11:
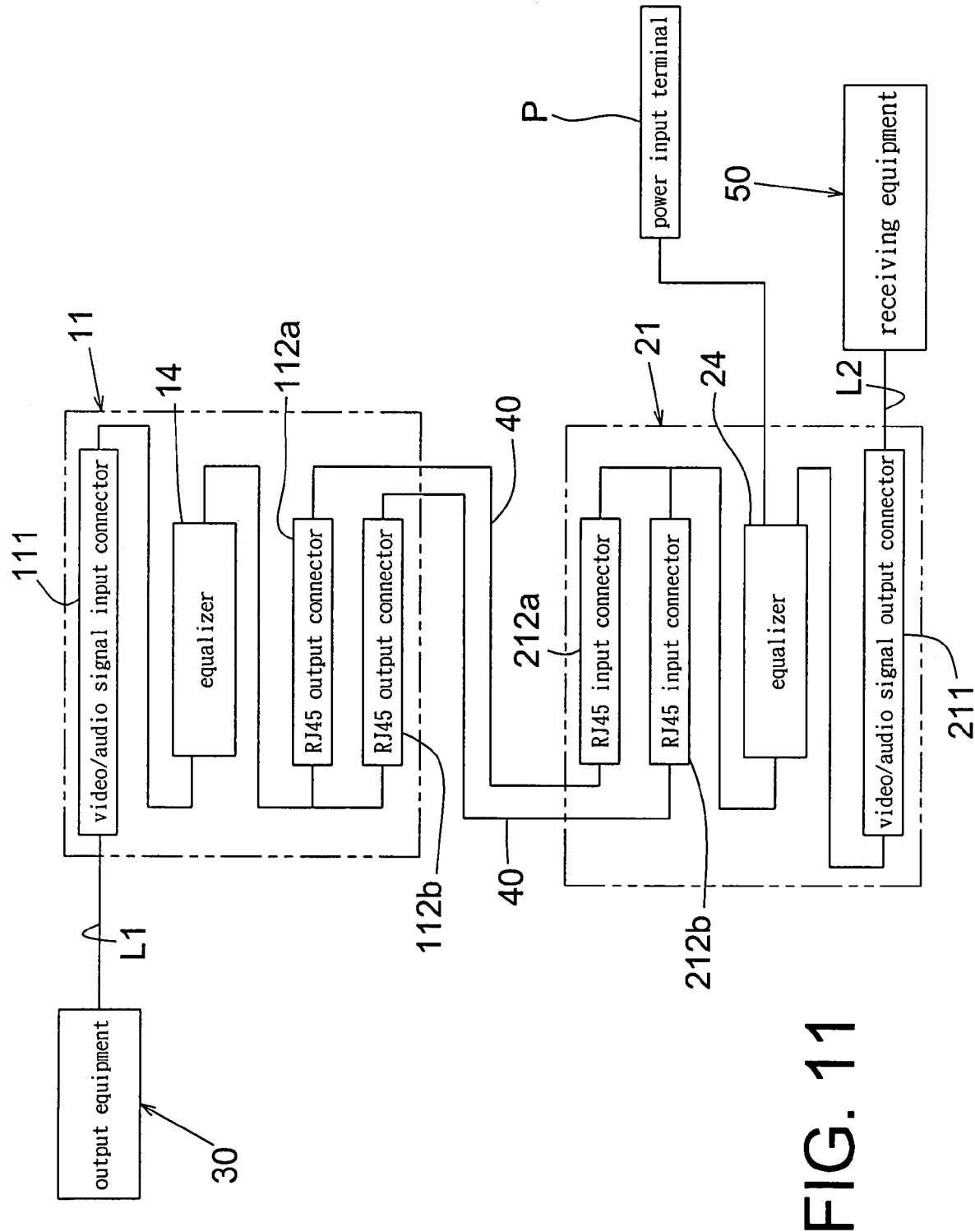
FIG. 11 is a block diagram of the second embodiment of the in-wall video/audio signal adapter device of the present invention, showing the application thereof.

Alternatively, as shown in FIGS. 10 and 11, in the in-wall video/audio signal adapter device of the present invention, the transmitter unit 11 is free from any power input terminal. Instead, the power input terminal P is installed on the receiver unit 21 for connecting with an external power supply, which supplies power necessary for signal conversion and transmission. In application, the signal output terminal of the output equipment 30 such as a multimedia player can be connected to the video/audio signal input connector 111 of the first adapter 10 via a video/audio signal transmission cable L1 by way of insertion. The video/audio signal transmission cable L1 can be an HDMI cable or a DisplayPort cable. The equalizer 14 of the transmitter unit 11 serves to convert and send the signals to the RJ45 output connectors 112a, 112b. The CAT5/CAT6 Internet signal transmission cables 40 previously laid in the wall W are connected between the RJ45 output connectors 112a, 112b of the first adapter 10 and the RJ45 input connectors 212a, 212b of the second adapter 20. The equalizer 24 of the receiver unit 21 of the second adapter 20 serves to convert and send the received signals to the video/audio signal output connector 211. The equalizer 24 is powered by the external power supply via the power input terminal P. The video/audio signal output connector 211 is connected to the receiving equipment 50 (such as a display) via a video/audio signal transmission cable L2. The video/audio signal transmission cable L2 can be an HDMI cable or a DisplayPort cable. Accordingly, the allowable mounting distance between the output equipment 30 and the receiving equipment 50 can be effectively elongated. The CAT5/CAT6 Internet signal transmission cables 40 connected between the first and second adapters 10, 20 are hidden in the wall W without being exposed to an indoor environment.

The in-wall video/audio signal adapter device of the present invention is characterized in that the first and second adapters 10, 20 are mounted in the first and second cavities W1, W2 previously formed on the wall W. The CAT5/CAT6 Internet signal transmission cables 40 are previously laid in the wall W to be connected between the first and second adapters 10, 20. Accordingly, the CAT5/CAT6 Internet signal transmission cables 40 connected between the first and second adapters 10, 20 are hidden in the wall W without being exposed to an indoor environment. This keeps the indoor environment tidy. Also, people are prevented from being accidentally tripped over by the CAT5/CAT6 Internet signal transmission cables 40.

The above embodiments are only used to illustrate the present invention, not intended to limit the scope thereof. Many modifications of the above embodiments can be made without departing from the spirit of the present invention.

What is claimed is:

1. An in-wall video/audio signal adapter device comprising:
   (a) a first adapter, the first adapter including a transmitter unit including a video/audio signal input connector, an equalizer, two RJ45 output connectors and a power input terminal, the transmitter unit being fixed on a mount, the mount having fixing holes for correspondingly locking the first adapter in a first cavity previously formed on a wall; and
   (b) a second adapter, the second adapter including a receiver unit including a video/audio signal output connector, an equalizer and two RJ45 input connectors, the receiver unit being fixed on a mount, the mount having fixing holes for correspondingly locking the second adapter in a second cavity previously formed on the wall, Internet signal transmission cables being previously embedded in the wall, whereby the Internet signal transmission cables are connected between the RJ45 output connectors of the first adapter and the RJ45 input connectors of the second adapter.

2. The in-wall video/audio signal adapter device as claimed in claim 1, wherein the mount of the first adapter includes a board body section, an insertion hole being formed through the board body section corresponding to the video/audio signal input connector of the transmitter unit, fixing lugs being disposed on a periphery of the board body section and projecting therefrom, each fixing lug being formed with multiple fixing holes, the mount of the first adapter further including a casing section locked behind a back face of the board body section, the transmitter unit being accommodated in the casing section, the casing section being formed with at least one perforation.

3. The in-wall video/audio signal adapter device as claimed in claim 1, wherein the mount of the second adapter includes a board body, an insertion hole being formed through the board body corresponding to the video/audio signal output connector of the receiver unit, fixing lugs being disposed on a periphery of the board body and projecting therefrom, each fixing lug being formed with multiple fixing holes, the mount of the second adapter further including a casing locked behind a back face of the board body, the receiver unit being accommodated in the casing, the casing being formed with at least one perforation.

4. The in-wall video/audio signal adapter device as claimed in claim 1, wherein the first adapter further includes an outer decorative board fixedly mounted on an outer face of the mount of the first adapter.

5. The in-wall video/audio signal adapter device as claimed in claim 1, wherein the second adapter further includes an outer decorative board fixedly mounted on an outer face of the mount of the second adapter.

6. An in-wall video/audio signal adapter device comprising:
   (a) a first adapter, the first adapter including a transmitter unit including a video/audio signal input connector, an equalizer and two RJ45 output connectors, the transmitter unit being fixed on a mount, the mount having fixing holes for correspondingly locking the first adapter in a first cavity previously formed on a wall; and
   (b) a second adapter, the second adapter including a receiver unit including a video/audio signal output connector, an equalizer, two RJ45 input connectors and a power input terminal, the receiver unit being fixed on a mount, the mount having fixing holes for correspondingly locking the second adapter in a second cavity previously formed on the wall, Internet signal transmission cables being previously embedded in the wall, whereby the Internet signal transmission cables are connected between the RJ45 output connectors of the first adapter and the RJ45 input connectors of the second adapter.

7. The in-wall video/audio signal adapter device as claimed in claim 6, wherein the mount of the first adapter includes a board body section, an insertion hole being formed through the board body section corresponding to the video/audio signal input connector of the transmitter unit, fixing lugs being disposed on a periphery of the board body section and projecting therefrom, each fixing lug being formed with multiple fixing holes, the mount of the first adapter further including a casing section locked behind a back face of the board body section, the transmitter unit being accommodated in the casing section, the casing section being formed with at least one perforation.

8. The in-wall video/audio signal adapter device as claimed in claim 6, wherein the mount of the second adapter includes a board body, an insertion hole being formed through the board body corresponding to the video/audio signal output connector of the receiver unit, fixing lugs being disposed on a periphery of the board body and projecting therefrom, each fixing lug being formed with multiple fixing holes, the mount of the second adapter further including a casing locked behind a back face of the board body, the receiver unit being accommodated in the casing, the casing being formed with at least one perforation.

9. The in-wall video/audio signal adapter device as claimed in claim 6, wherein the first adapter further includes an outer decorative board fixedly mounted on an outer face of the mount of the first adapter.

10. The in-wall video/audio signal adapter device as claimed in claim 6, wherein the second adapter further includes an outer decorative board fixedly mounted on an outer face of the mount of the second adapter.

* * * * *